Oct. 6, 1959 P. C. GUNN 2,907,491
GARBAGE CAN
Filed Sept. 12, 1956 5 Sheets-Sheet 3
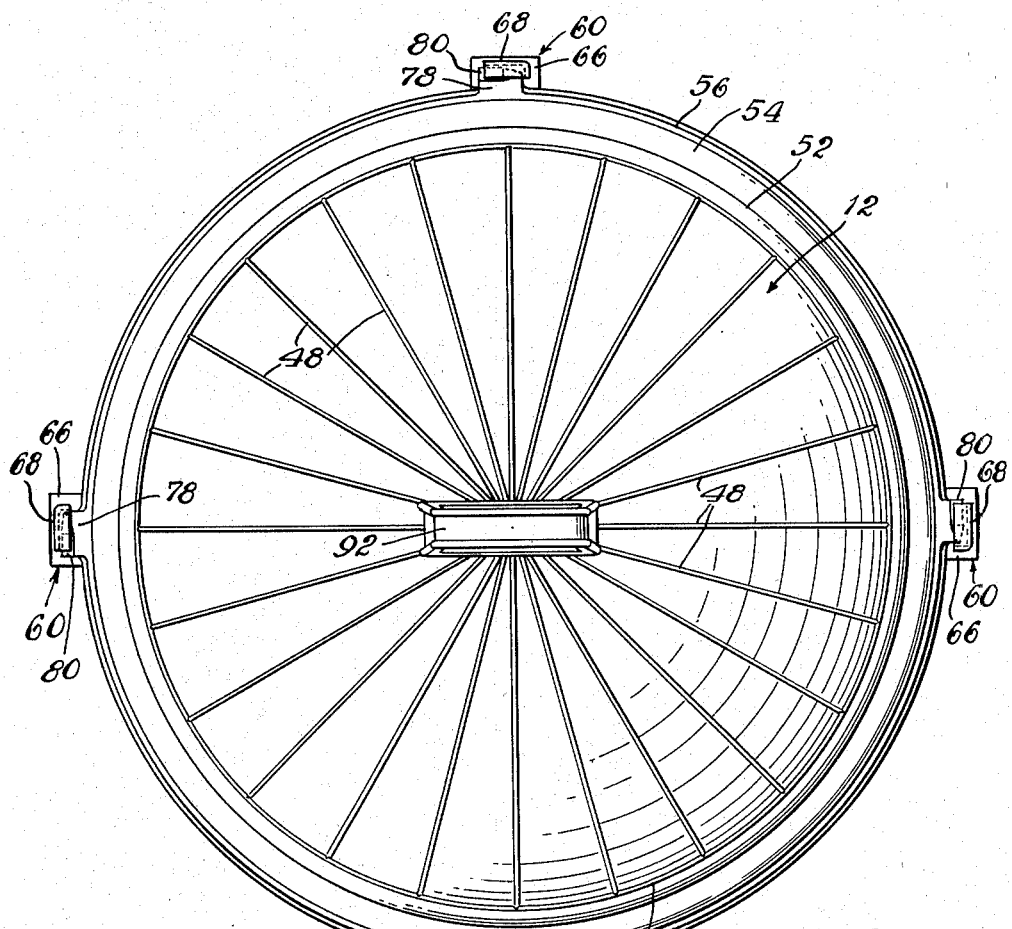
Fig. 3
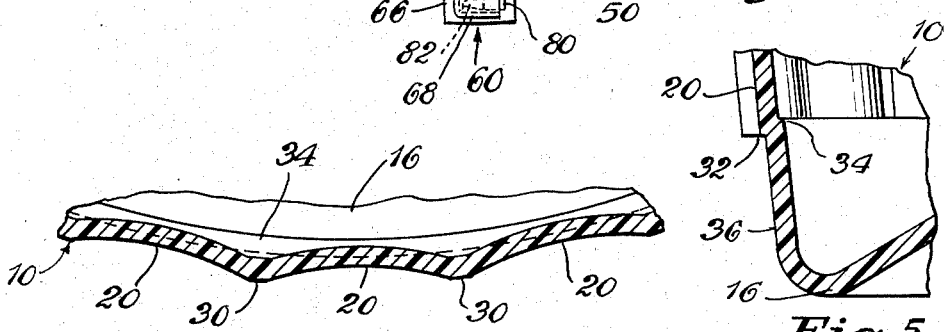
Fig. 4
Fig. 5
Inventor
Paul C. Gunn
by Parker & Carter
Attorneys

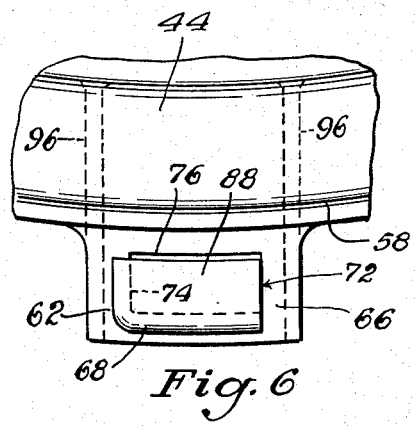
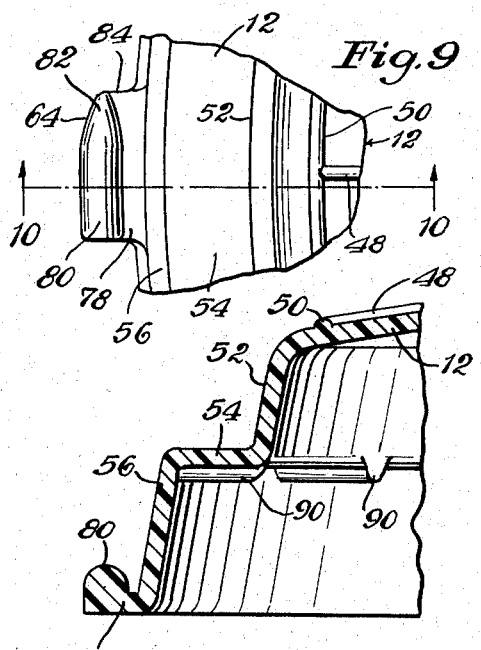
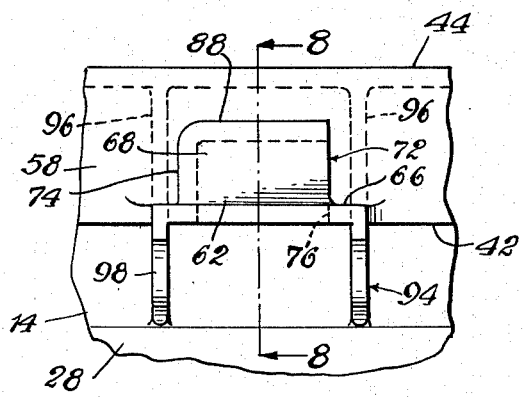
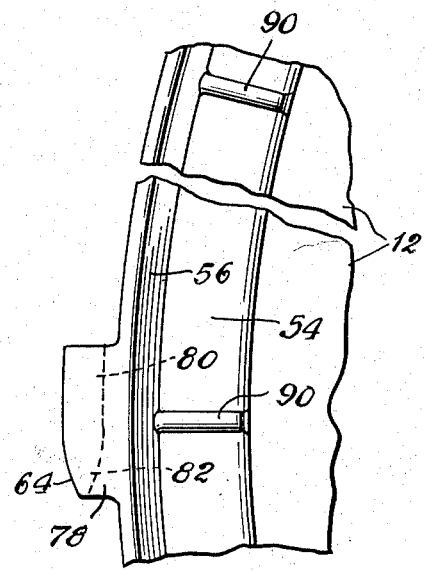
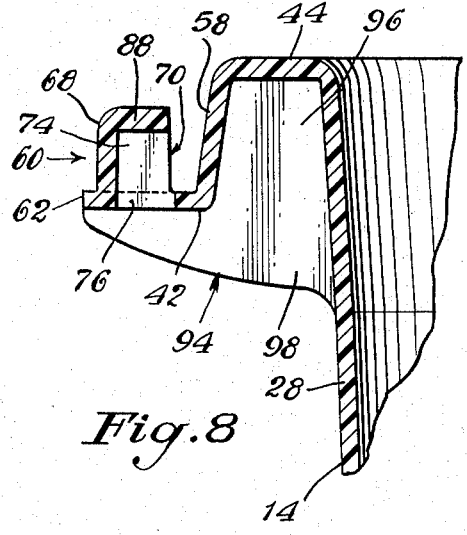

United States Patent Office 2,907,491
Patented Oct. 6, 1959

2,907,491

GARBAGE CAN

Paul C. Gunn, Fort Worth, Tex., assignor to Loma Plastics, Inc., Fort Worth, Tex., a corporation of Texas Application September 12, 1956, Serial No. 609,441

2 Claims. (Cl. 220—40)

This invention is in the field of molded plastic containers, for example, garbage cans although it is not necessarily limited thereto and an overall object is a garbage can, preferably all plastic, which will withstand present day abuse, and therefore, have a much longer life.

Another object is a molded container or the like with rectilinearly rigid side walls including downwardly tapered flutes.

Another object is a removable top, preferably all plastic, for such a container constructed to provide air circulation for the contents of the container.

Another object is a container and top of the above type constructed to prevent the accumulation of excess moisture in the container.

Another object is a container and top with an interlock which makes the top easy to remove and replace but at the same time provides a rigid connection so that the container, fully loaded, can be lifted by the top.

Another object is a molded all plastic upwardly truncated container which will not easily collapse or bow in when subjected to axial pressure.

Another object is a connection for a container and top which is self-cleaning.

Another object is a container of the above type which has a strengthened portion in the side wall near the base or bottom wall.

Figure 1:
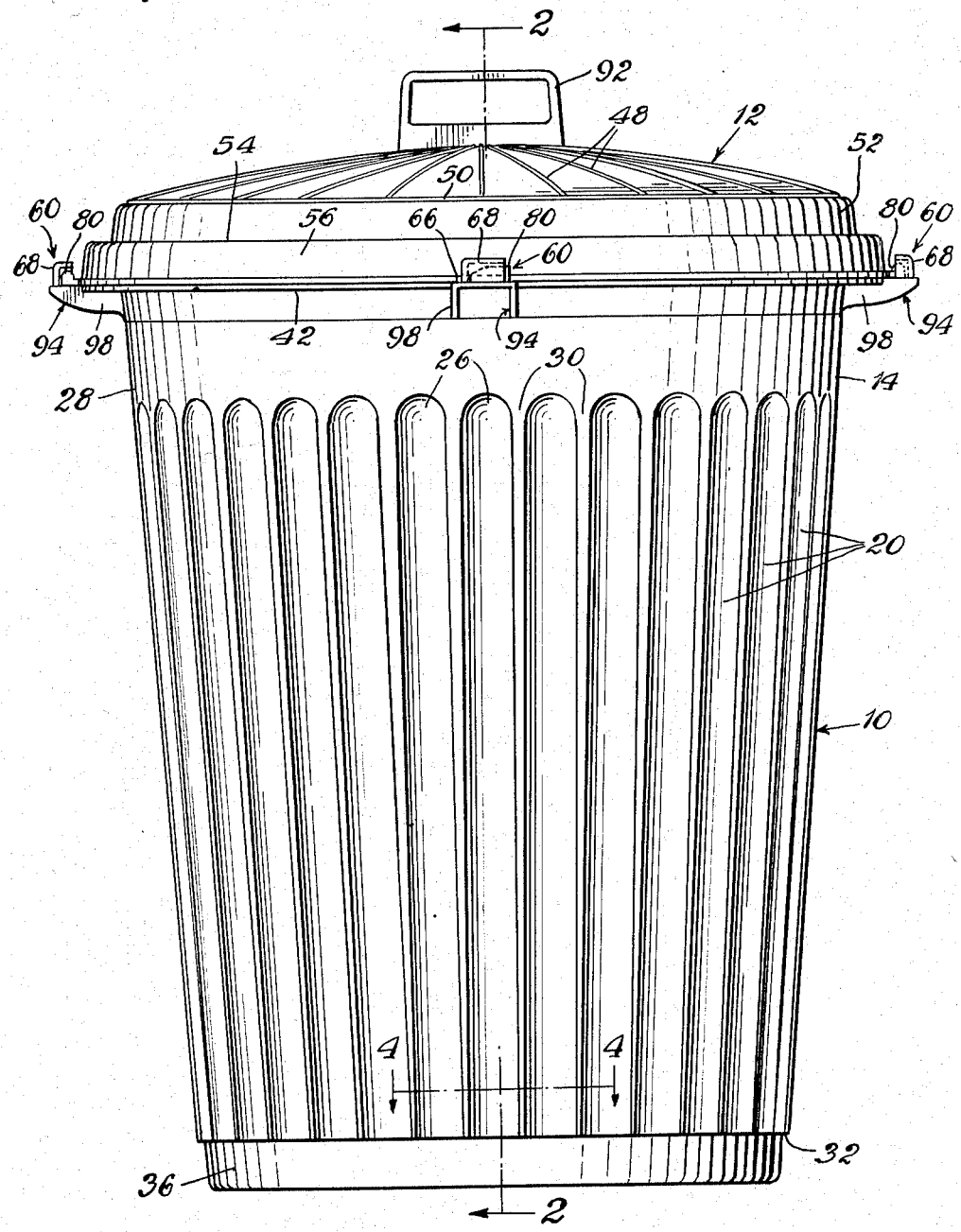
Figure 2:
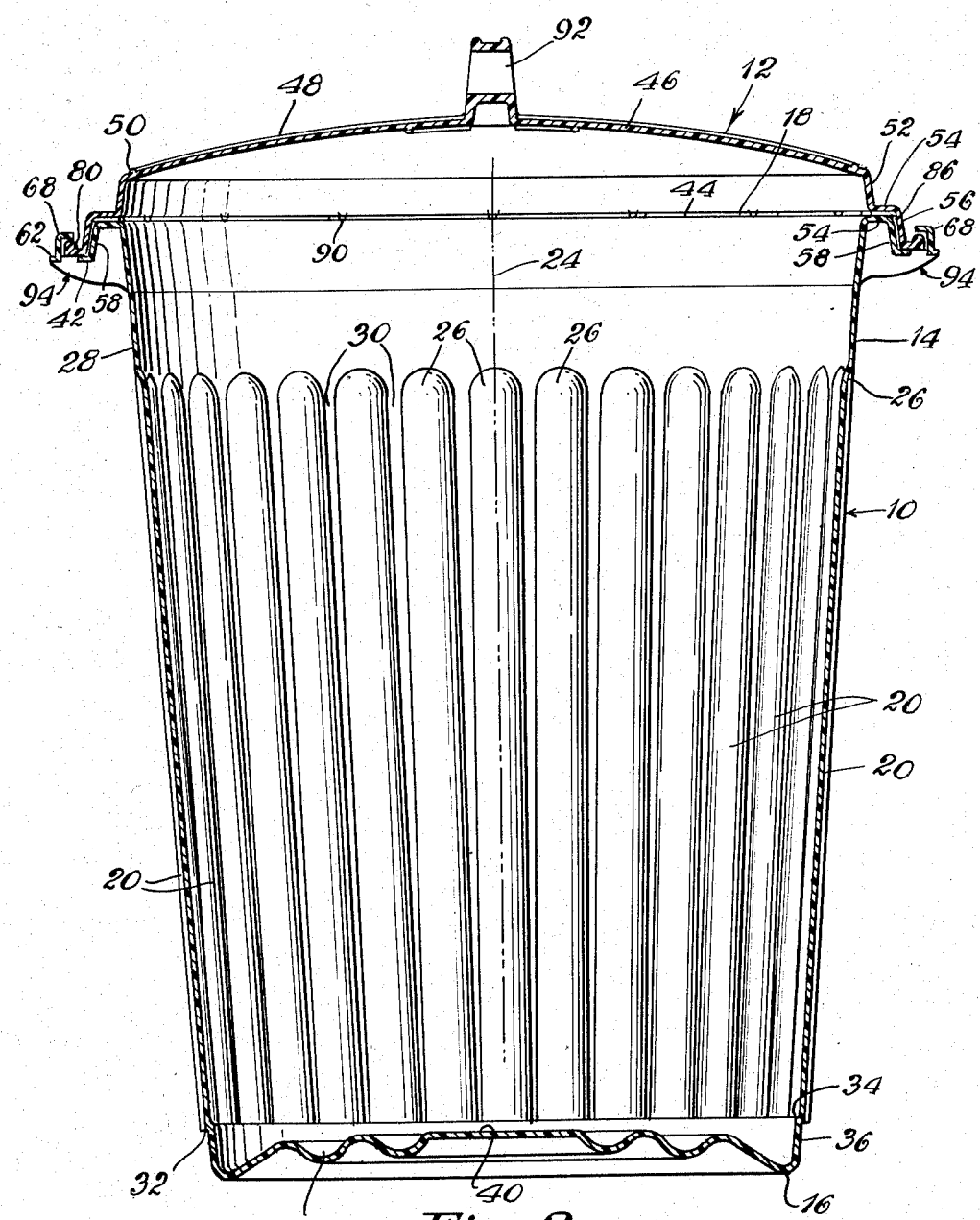
Figure 12:
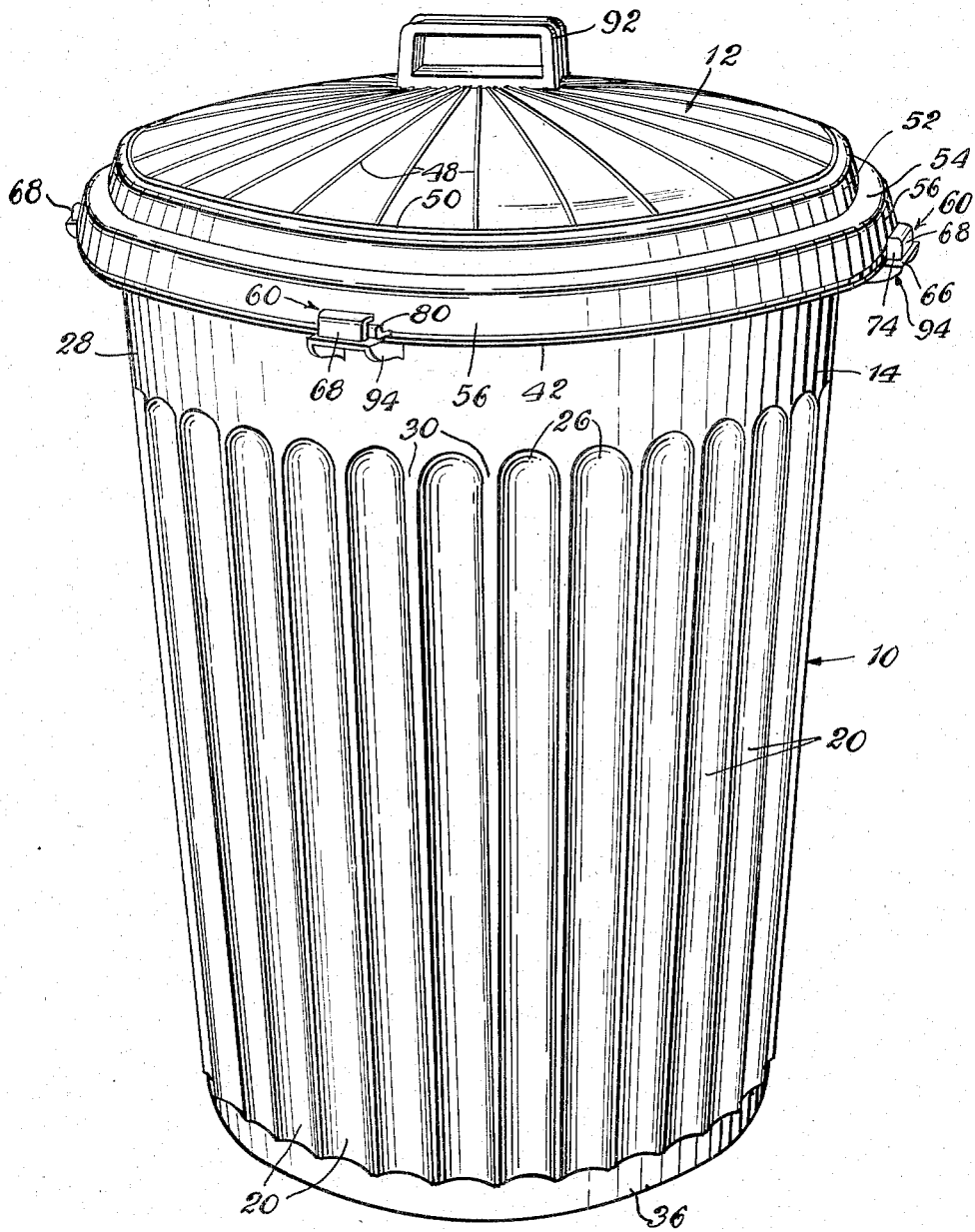

Other objects will appear from time to time in the ensuing specification and drawings in which:

Figure 1 is a side view of my container and its top;
Figure 2 is a section along line 2—2 of Figure 1;
Figure 3 is a top view of Figure 1;
Figure 4 is a section on an enlarged scale along line 4—4 of Figure 1;
Figure 5 is a part of Figure 2, on an enlarged scale;
Figure 6 is a plan view of a part of Figure 3, on an enlarged scale;
Figure 7 is a side view of Figure 6;
Figure 8 is a section along line 8—8 of Figure 7;
Figure 9 is a plan view of a portion of the top showing the interlock;
Figure 10 is a section along line 10—10 of Figure 9;
Figure 11 is a bottom view of a portion of the top; and
Figure 12 is a perspective.

In Figure 1, a garbage can or the like, indicated generally at 10, is shown with a cover 12, which is removable. While I have shown a two-piece unit, there might be more.

In Figure 2, the can or container includes a peripherally continuous side wall or body 14 which is truncated upwardly or frusto conical from an integral base or bottom wall 16 up to what may be considered a generally open upper end 18 when the cover is removed.

I prefer that both the cover and the container be molded or made solely of plastic. For example, I find that a polyethylene body or container may be advantageously used with a polystyrene lid or cover. But other conventional plastics having the desired characteristics may be used.

Considering the container or body, the side wall 14 has a plurality of longitudinally disposed flutes 20, all of which originate generally in the same plane disposed somewhat perpendicular to the container axis 24. Each flute or groove terminates at its upper end in a semi-circular concave or finger-like portion 26 to flow smoothly into an upper smooth frusto conical surface or area 28.

The flutes are all tapered slightly downwardly so that they are smaller at their upper end than at the lower end. Flats 30 between adjacent flutes practically come to a point at the lower end. A step, ridge or shoulder 32 is provided near the bottom wall, as shown on an enlarged scale in Figure 3, and a slight offset 34 on the inside is provided for a purpose set forth hereinafter. The shoulder or step is spaced from the bottom wall providing a smooth surface 36 and the bottom is closed by the integral wall 16 which is provided with a plurality of concentric rings, fluctuations or undulations 38 with a smooth center or flat 40.

In Figure 4, a section of the fluted side wall is shown and it can be seen that the flutes are arcuate in cross section providing somewhat elevated intermediate ridges formed into flats 30 and interconnecting shallow channels which result in a rectilinear rigidity providing major resistance to axial pressure.

The upper or open end of the can or container is outwardly rolled over or turned so that the lower free edge 42 lies in a plane below the plane of the upper edge or open end. Additionally, the rolled over portion is flatted at 44 to provide an annular flattened surface to accept the top.

Turning to the top, it outwardly appears as a somewhat convex or domed up top wall 46 with a plurality of somewhat equally spaced radially disposed reinforcing ribs 48 integrally formed with the top or dome and stopping at a circular raised rib 50 near the outer edge. Referring to Figure 10, the domed portion turns down to provide a somewhat conical section 52 which joins a laterally disposed annular portion 54 followed by a conical or downwardly truncated section 56 which terminates in a lateral free edge.

Returning to the top or rim of the container, the turned over portion has a frusto conical lip or skirt 58 extending down from the annular flat 44 to the free edge 42. When the top is mounted on a container, the flat 44 on the container corresponds to and matches the annular portion 54 on the top whereas the conical skirt 58 on the container opposes the conical section 56 on the top or cover.

As shown in Figure 3, I provide a plurality of interlocks 60 each of which includes a female element 62 formed integrally with the turned over skirt or rim on the container and a male element 64 integral with the top, the two combining to provide what is termed a bayonet joint. I have shown four in Figure 3, but more or less could be used.

As shown, a platform 66 or the like formed integrally with the free edge of the rolled over portion of the container has a hood or catch 68 rising above it. The hood opens inwardly at 70 and is open on one end at 72 but has an upstanding abutting wall 74 at the other end. The platform or support is centrally apertured at 76 for purposes to be set forth hereinafter.

The male element includes a tab 78 projecting laterally from the free edge of the cover with a raised wedge or bead 80 which is tapered generally at one end as at 82 and terminates in a forward abutting edge 84. The dimensioning of the circumferential wall 58 and the portion 56 on the cover that opposes it is such that a slight spacing or gap 86 normally exists between them. Additionally, the vertical dimension of the male element of the bayonet joint relative to the dimensions of the female element or hood or catch may be such that a loose fit is provided so that the cover will not stick. Also, the hood or female element could be turned over or hook shaped as at 88 to provide a better interlock if desired.

Inside the cover, a plurality of somewhat radially disposed projections or ridges 90 may be provided formed integrally on the annular flat surface 54 to oppose the upper flat 44 on the container, the purpose being to provide a series of annular gaps or air spaces between the container and the cover. Additionally, these ribs or projections may function as a reinforcement tying the irregular portions of the cover together to prevent it from collapsing when the unit is sat on, compressed, or otherwise subjected to a crushing force.

The cover may have a centrally located handle 92 which is shown as a raised continuous strap formed integrally with the dome, but it could be otherwise.

I provide a strut support for the bayonet joint which may include a pair of somewhat parallel webs or struts 94 formed integrally with the side wall, the turned over upper end and the platform for the hood or cap. As shown in Figure 7, two such webs or struts are used, one at the forward edge of the platform and one at the rear edge. But more could be used if desired. In any event, an interior web portion 96 is formed integrally between the side wall, the top flat 44 and the skirt 58, while a dihedral tie piece or portion 98 extends down the side wall a substantial distance and ties the outer end of the catch supporting platform to the body of the container.

The use, operation and function of my invention are as follows:

I provide what I refer is an all plastic molded garbage can, both the can or container and the top.

One of the problems that normally arises with garbage cans is the problem of condensation of the moisture from the contents, garbage or otherwise, in the can. The moisture will normally condense on the inner surface of the top and run down the side. At times as much as three or four inches has been known to accumulate in the bottom of the container, and this, when mixed with the garbage, results in an unpleasant condition.

To prevent this, I provide a spacing between the upper edge of container and the cover, both between what would normally be the abutting surfaces, for example, the flat 44 on the container and the annular portion 54 on the cover, and also between the opposed skirts, for example, the portion 58 on the container and the portion 56 on the cover. This provides a very effective air circulation. At the same time, the moisture when formed into droplets on the lower surface of the cover will run down and will pass through these openings or slots and drip off the free edge of the skirt 58. Additionally, the projections or ribs 90 in the cover which space the air space serve to tie the irregular surfaces at the edge of the cover together to resist compressive forces applied to the cover.

The container and cover may be interconnected by merely positioning the cover over the container and turning it clockwise, as in Figure 3. The male elements slip into the hoods or catches. The edge 94 abuts the wall 74. The entire container can then be lifted by the handle 92. The bayonet joints are slightly loose so that no sticking occurs when the top is turned counterclockwise.

Each hood or catch 68 is integrally tied to the side wall of the container by what I term a dihedral strut which is formed integrally with both the platform carrying the bayonet joint and the side wall extends up inside the rolled over edge. I prefer that two such struts be used, one forward and one behind the platform, each integral. But it is important that the platform be properly supported and reinforced because with the top in place when the container is carried by the handle 92 the outer edge of the container would otherwise be pulled up and distorted. At the same time, the edge or skirt 58 could become tucked under or crushed so that each of the interlocks would not connect or would not hit. But the reinforcing struts maintain the catch 68 in a set position.

The fluted sides or side walls provide substantial rectilinear strength or rigidity. At the same time, the flutes are tapered downwardly terminating in a step or shoulder which gives greatly increased strength to the lower region of the container. This, combined with the offset portion at 34, prevents the continuous side wall from buckling or bowing in when the container is subjected to pressure.

I also prefer that the platform supporting the catch or female element of the bayonet joint be centrally apertured so that the connection will be self-cleaning and will not collect foreign matter to cause sticking.

The frusto conical section below the step 32, designated at 36, provides a strong bottom wall which with the shoulder at the bottom of the flute gives the rectilinear rigidity.

While I have stated that the lid may be polystyrene and the body polyethylene, any suitable plastic could be used. I have shown and described the preferred form of my invention and it should be understood that numerous modifications, substitutions, alterations and changes can be made without departing from the invention's fundamental theme. I, therefore, wish that my invention be unrestricted except as by the appended claims.

I claim:

1. In a garbage can or the like, an upwardly truncated plastic body closed at its lower end by an integral lateral bottom wall, the upper end of the body being generally open and having a flanged portion formed outwardly into an annular flattened surface generally at right angles to the body axis and formed downwardly into a somewhat frusto-conical skirt terminating in a lower free edge lying in a plane spaced below the general plane of the annular flattened surface, a removable top adapted to close the open upper end of the body and having a centrally located integral handle on the outside surface, a marginal flange on the circumference overlying at least a part of the flanged portion, of the body when the top is in place, the marginal flange having an intermediate lateral annular portion bounded by a downward section terminating in a bottom edge, the intermediate annular portion on the top being opposite and in engagement with the annular flattened portion on the body, and the downward section on the top being opposite and in spaced relation to the somewhat frusto-conical skirt on the body with the bottom free edge of the top being disposed below the open upper end of the body when the top is disposed thereon, a plurality of spaced interlocks at the lower free edges of the top and body each made up of at least two elements, one on the top and the other on the body constructed to engage and to lock the top and body together loosely when the top is rotated in one direction and to disengage and free the top when rotated in the other direction, the annular flattened surface and frusto-conical skirt on the body engaging and positioning the intermediate lateral annular portion and the downward section on the top to pilot the top in place so that, upon rotation thereof, the interlocks will be automatically guided together, the axial spacing between the elements of the interlocks and the engaging annular flattened surface on the body and the intermediate lateral annular portion on the top being such that the top will be relatively loose when mounted on the body and the interlocks are engaged, and lateral struts under the flanged portion at each interlock integral with the body and flanged portion to provide an integral brace between each interlock and the body so that when the interlocks are engaged and the garbage can is picked up by the handle on the top, the lifting force applied through the interlocks will be carried by the lateral struts directly to the side walls of the body.

2. The structure of claim 1 further characterized by and including a plurality of circumferentially spaced projections on the intermediate lateral annular portion of the top constructed to engage the annular flattened surface on the body to uniformly space the top from the body thereby providing for air circulation.

References Cited in the file of this patent

UNITED STATES PATENTS

| | | |
|---|---|---|
| 533,765 | Wanner | Feb. 5, 1895 |
| 1,482,015 | Kielberg | Jan. 29, 1924 |
| 1,843,918 | Cornell | Feb. 9, 1932 |
| 1,926,240 | Maas | Sept. 12, 1933 |
| 1,927,029 | Hammer | Sept. 19, 1933 |
| 2,069,125 | Antrim | Jan. 26, 1937 |
| 2,123,126 | Urech | July 5, 1938 |
| 2,134,759 | Howlett | Nov. 1, 1938 |
| 2,322,236 | Ingram | June 22, 1943 |
| 2,368,795 | Wittenberg | Feb. 6, 1945 |
| 2,403,778 | Zdanaitis | July 9, 1946 |
| 2,459,346 | Thompson | Jan. 18, 1949 |
| 2,679,878 | Stive | June 1, 1954 |
| 2,765,832 | Tupper | Oct. 9, 1956 |